(12) United States Patent
Cipolla

(10) Patent No.: US 8,610,343 B2
(45) Date of Patent: Dec. 17, 2013

(54) VACUUM ELECTRON DEVICE ELECTRODES AND COMPONENTS MANUFACTURED FROM HIGHLY ORIENTED PYROLYTIC GRAPHITE (HOPG)

(75) Inventor: John Charles Cipolla, Montoursville, PA (US)

(73) Assignee: L-3 Communications Corporation, San Carlos, CA (US)

( * ) Notice: Subject to any disclaimer, the term of this patent is extended or adjusted under 35 U.S.C. 154(b) by 0 days.

(21) Appl. No.: 13/492,645

(22) Filed: Jun. 8, 2012

(65) Prior Publication Data

US 2012/0313505 A1 Dec. 13, 2012

Related U.S. Application Data

(60) Provisional application No. 61/495,213, filed on Jun. 9, 2011.

(51) Int. Cl.
*H01J 1/00* (2006.01)
*H01J 13/08* (2006.01)
*H01J 1/02* (2006.01)

(52) U.S. Cl.
USPC ........... 313/352; 313/326; 313/353; 313/354; 313/355; 313/356

(58) Field of Classification Search
None
See application file for complete search history.

(56) References Cited

U.S. PATENT DOCUMENTS

| | | | | |
|---|---|---|---|---|
| 5,990,622 | A * | 11/1999 | Schult et al. | 315/5.37 |
| 7,948,185 | B2 * | 5/2011 | Smith et al. | 315/111.21 |
| 2002/0127169 | A1 * | 9/2002 | Smalley et al. | 423/447.1 |
| 2002/0136683 | A1 * | 9/2002 | Smalley et al. | 423/461 |

* cited by examiner

*Primary Examiner* — Natalie Walford
(74) *Attorney, Agent, or Firm* — O'Melveny & Myers LLP

(57) ABSTRACT

Components for use in vacuum electron devices are fabricated from highly oriented pyrolytic graphite (HOPG) and exhibit excellent thermal conductivity, low sputtering rates, and low ion erosion rates as compared to conventional components made from copper or molybdenum. HOPG can be reliably brazed by carefully controlling tolerances, calculating braze joint material volume, and applying appropriate compression during furnace operations. The resulting components exhibit superior thermal performance and enhanced resistance to ion erosion and pitting.

22 Claims, 16 Drawing Sheets

VACUUM ELECTRON DEVICE ELECTRODES AND COMPONENTS MANUFACTURED FROM HIGHLY ORIENTED PYROLYTIC GRAPHITE (HOPG)

RELATED APPLICATIONS DATA

This application claims priority pursuant to 35 U.S.C. §119 (e) to U.S. provisional patent application Ser. No. 61/495,213 filed Jun. 9, 2011, the subject matter of which is incorporated by reference herein in its entirety.

BACKGROUND OF THE INVENTION

1. Field of the Invention

The present invention relates to improved vacuum electron device electrodes and other microwave components manufactured from highly oriented pyrolytic graphite (HOPG).

2. Description of Related Art

The components used in the manufacture and assembly of vacuum electron devices, such as RF output vanes, RF straps, traveling wave tube (TWT) slow wave circuits and output lines, Linear Beam cavity drift tubes, meander lines, and thyratron electrodes, among others, are known in the art. These components are very typically manufactured from copper because of its good thermal conductivity, relative low cost, and machineability. For higher peak power densities, the copper is often cladded with tungsten or molybdenum.

For example, FIGS. 1a through 1c depict an internally cooled copper vane 102 from an AEGIS-style microwave amplifier, typical of the prior art, that failed due to cavitation erosion. As evident from the figures, the cooling channel 104 in the vane 102 shows cavitation damage in region 106 and pinhole breakthrough that caused failure of this device.

Up to now, suitable alternatives to copper and copper clad for manufacturing microwave electrodes have not been known or been readily available. While certain materials are known to have high thermal conductivity and other desirable properties, they have not been considered for use as microwave components because of the perceived difficulty of machining, brazing, and otherwise adapting them for microwave applications. For example, it is known that highly-oriented pyrolytic graphite (HOPG) has a very high thermal conductivity over four times that of copper. However, it is expensive, it is a soft material, like mica, that is difficult to machine, it is not readily susceptible to electrical discharge machining (EDM), and it has been perceived as difficult to reliably braze. In addition, pyrolytic graphite is highly anisotropic. The physical properties vary widely, dependent on the chosen plane of its hexagonal crystal structure. It would thus be advantageous to demonstrate methods by which HOPG can be employed to manufacture reliable and high-performance microwave components that overcome the disadvantages of the prior art.

SUMMARY OF THE INVENTION

An embodiment of the present invention comprises a component for use in a vacuum electron device comprising a first portion constructed from highly oriented pyrolytic graphite (HOPG) and having a high thermal conductivity. The component also includes a second portion constructed from a metal that is brazed to the HOPG portion, the braze joint providing both mechanical and thermal coupling between the HOPG portion and the metal portion.

In some embodiments, the metal portion is constructed from copper, molybdenum, kovar, or a copper-molybdenum alloy. The braze material may comprise a gold-copper alloy in some embodiments.

In some embodiments of the present invention, the component manufactured from HOPG and metal exhibits a thermal conductivity that is higher than a similar component made from metal. The component may comprise a cross field amplifier (CFA) vane structure, a magnetron structure, an electron tube anode or cathode structure, or any other such component known in the art.

In some embodiments, the metal portion may be milled to create a cavity within which the HOPG portion fits in order to facilitate brazing.

A method of manufacturing a microwave component in accordance with an embodiment of the present invention includes the steps of machining a metal portion to create a brazing surface and machining an HOPG insert to fit closely within the machined metal portion. In some embodiments, the metal portion may be machined to leave a thin web of material that provides a brazing surface. The machining may be performed using a diamond blade. A volume of braze alloy is calculated to fit within the space between the machined metal portion and the HOPG insert. The assembly is then heated in a brazing furnace to create a mechanical and thermal bond between the metal portion and the HOPG portion. The brazing operation may be performed in a vacuum or in a nitrogen atmosphere.

In some embodiments of the claimed method, the process of assembling the component includes covering the HOPG portion with a metal foil that is then bonded through active brazing. The metal foil may comprise a foil made from copper, copper-molybdenum, molybdenum, kovar, or other suitable metals known in the art.

In some embodiments of the claimed method, the HOPG and metal assembly is wrapped in nichrome wire in order to create a clamp that maintains compressive force on the assembly during the brazing process to eliminate voids in the braze joint. In some embodiments, the nichrome wire is bent to create spring tension that applies pressure to the assembly during brazing.

A clamping fixture in accordance with an embodiment of the present invention applies pressure to an assembly comprising an HOPG portion and a metal portion while the assembly is brazed. One embodiment of the clamping fixture includes a first block positioned on a first side of the assembly and a second block positioned on an opposite side of the assembly. The blocks may be made from steel. A tensioning device applies pressure to the two blocks to compress the HOPG and metal assembly between them during the brazing process.

In one embodiment, the tensioning device comprises one or more loops of nichrome wire wrapped around the blocks and the HOPG assembly. In some embodiments, the nichrome wire is bent to create spring tension for increased pressure during the brazing process. In another embodiment, the tensioning device comprises a cantilevered tensioning spring that applies pressure to the HOPG assembly.

In some embodiments of a clamping fixture, at least one sheet of boron nitride felt is applied between one of the blocks and the HOPG assembly so that any excess braze alloy that squeezes out will not bond to the blocks of the clamping fixture.

The invention is described in detail below with reference to the appended sheets of drawings which are first described briefly below.

DETAILED DESCRIPTION OF THE PREFERRED EMBODIMENT

Figure 1A:
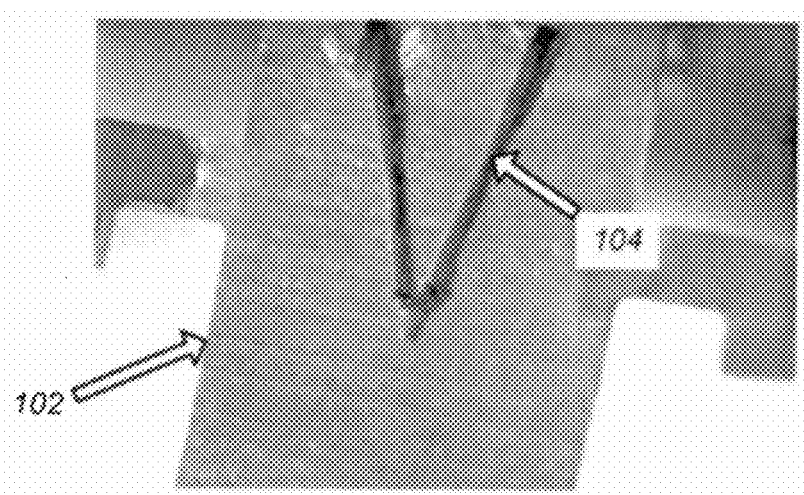
FIGS. 1a-1c depict a copper vane for a microwave amplifier typical of the prior art showing signs of cavitation erosion.
Figure 1B:
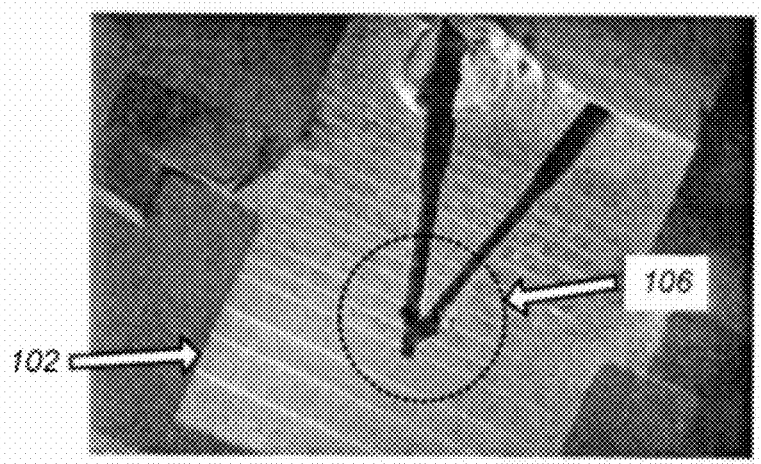
Figure 1C:
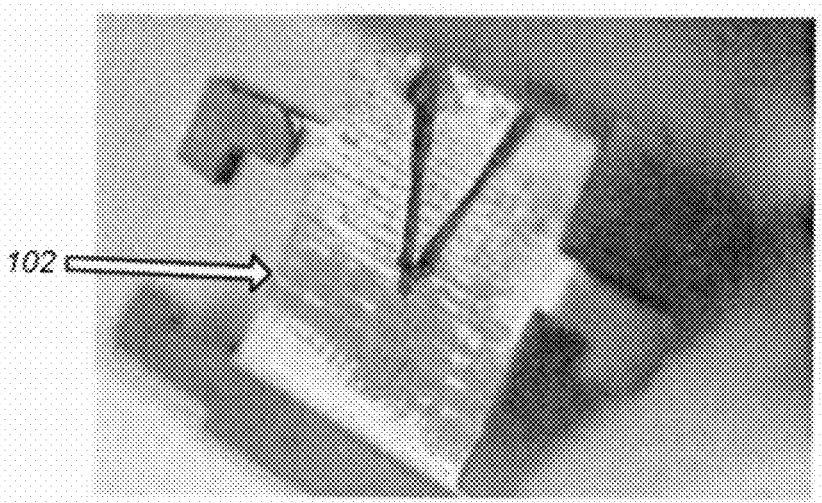

The present invention relates to reliable microwave components with desirable properties manufactured from HOPG. Graphite generally comprises multiple layers of carbon atoms arranged in planar hexagonal lattices. In its highly oriented pyrolytic form, the hexagonal lattice sheets have an angular spread of less than one degree. This structure results in properties that are highly desirable for use in vacuum electron devices. For example, HOPG is 100% theoretically dense, just like diamond, and thus is well suited for use as a vacuum barrier. When used to manufacture components that form part of the vacuum seal, HOPG maintains vacuum integrity. HOPG also possesses the lowest sputtering rate of all materials. Thus, electrodes made from HOPG will emit far fewer contaminating trace elements during operation than will copper or molybdenum electrodes. Further contributing to this property is that fact that HOPG has an extremely high melting point. It is refectory and changes state at a temperature of 3650° C. as compared to copper's melting point of just 1080° C. HOPG is thus grown on a graphite substrate in reactor vessels at temperatures of up to 3000° C., and contaminates are simply precipitated out, resulting in an extremely pure finished product.

HOPG also exhibits a very low ion erosion rate compared to copper or molybdenum. For microwave devices that exhibit failure modes due to ion erosion, HOPG dramatically improves operational lifetime. HOPG also exhibits a very low vapor pressure, which reduces electron ionization of the residual gas in vacuum electron devices. It is likely that gas ionization, ionization of sputtered elements, and secondary electron yield are responsible for presenting charge that is out of favorable phase to the output electrodes of vacuum devices, resulting in degraded operation. In particular, this out-of-favorable-phase charge collected at the output electrodes manifests as spurious RF output noise. Electrodes made from HOPG will thus result in vacuum devices that exhibit lower RF noise at comparable operating conditions when compared with standard devices employing copper or molybdenum electrodes.

HOPG also possesses a very high thermal conductivity close to that of diamond and at least four time greater than that of copper. This enables HOPG components to dissipate far higher thermal loads before exhibiting thermal damage. This enables vacuum electron devices to be designed for and to operate at much higher power densities.

Because x-ray radiation produced by electron bombardment is a linear function of the target's molecular weight, HOPG, which is just carbon, inherently produces less than half of the radiation of a device using copper electrodes. It is true that HOPG's lower density will also provide less shielding of the x-rays that are produced. However, for many applications, such as electrodes for klytstrons and thyratrons, the anode line-of-sight emission will be reduced.

HOPG is also extremely geometrically stable with respect to operating temperature and exhibits a coefficient of thermal expansion lower than that of silica. Vacuum electron devices requiring close mechanical tolerances as a function of temperature thus benefit enormously from HOPG components. In addition, the flexural strength of HOPG actually increases with temperature. This, in conjunction with its low mass, enables the design of very strong isolated components with improved tolerance of shock and vibration.

The spectral thermal emissivity of HOPG approaches 1, i.e., its behavior approaches that of an ideal blackbody. Designs that include electrodes made from HOPG operating at elevated temperature thus benefit from the increased thermal radiative heat transfer. Furthermore, the volumetric heat capacity of HOPG increases with temperature. Thus, resistance to arcing damage actually increases as the temperature of electrodes, such as anodes or cathodes made from HOPG, is increased.

Figure 2:
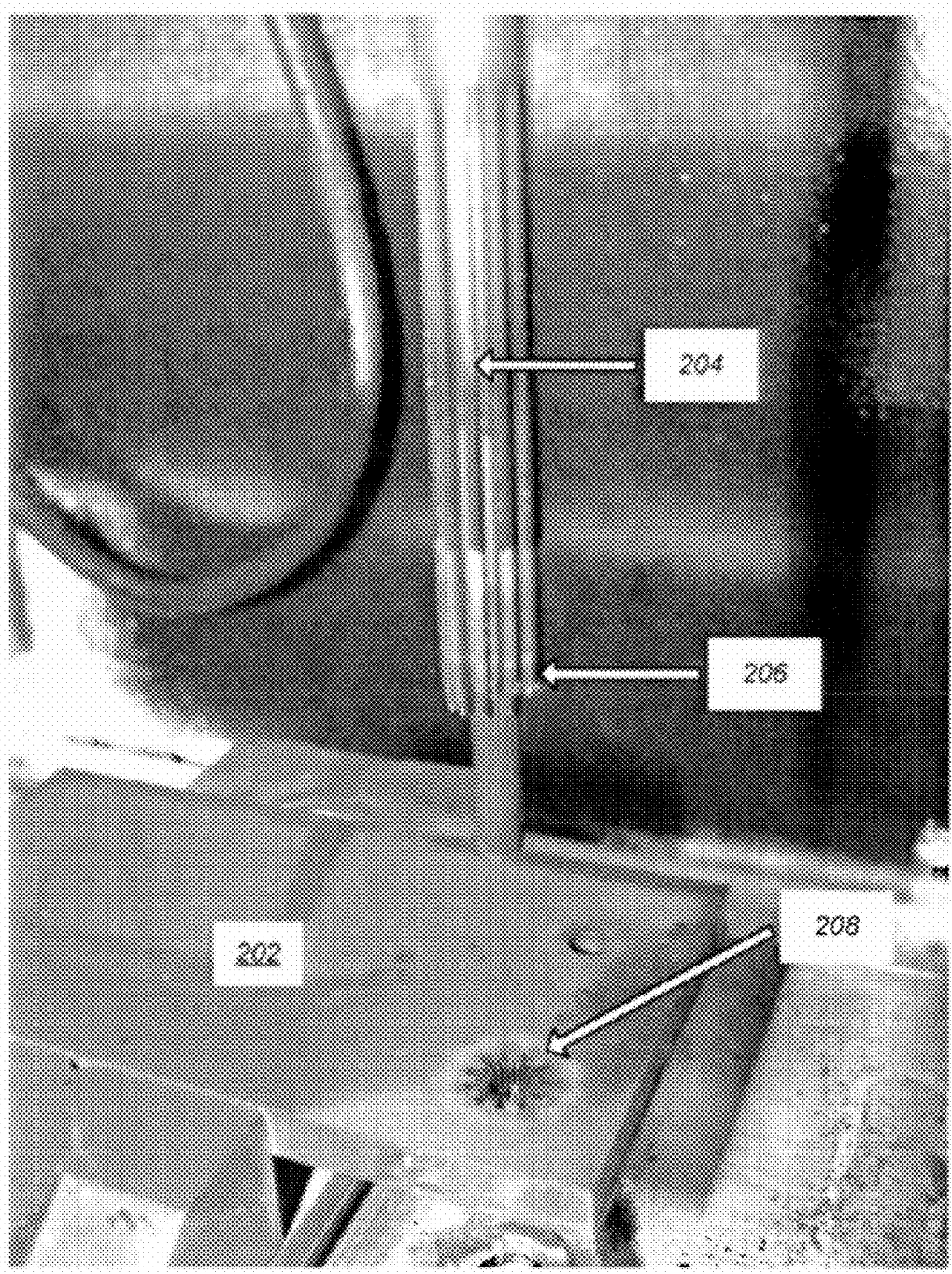
FIG. 2 depicts a block of HOPG being machined by EDM techniques in accordance with an embodiment of the present invention.
Figure 3:
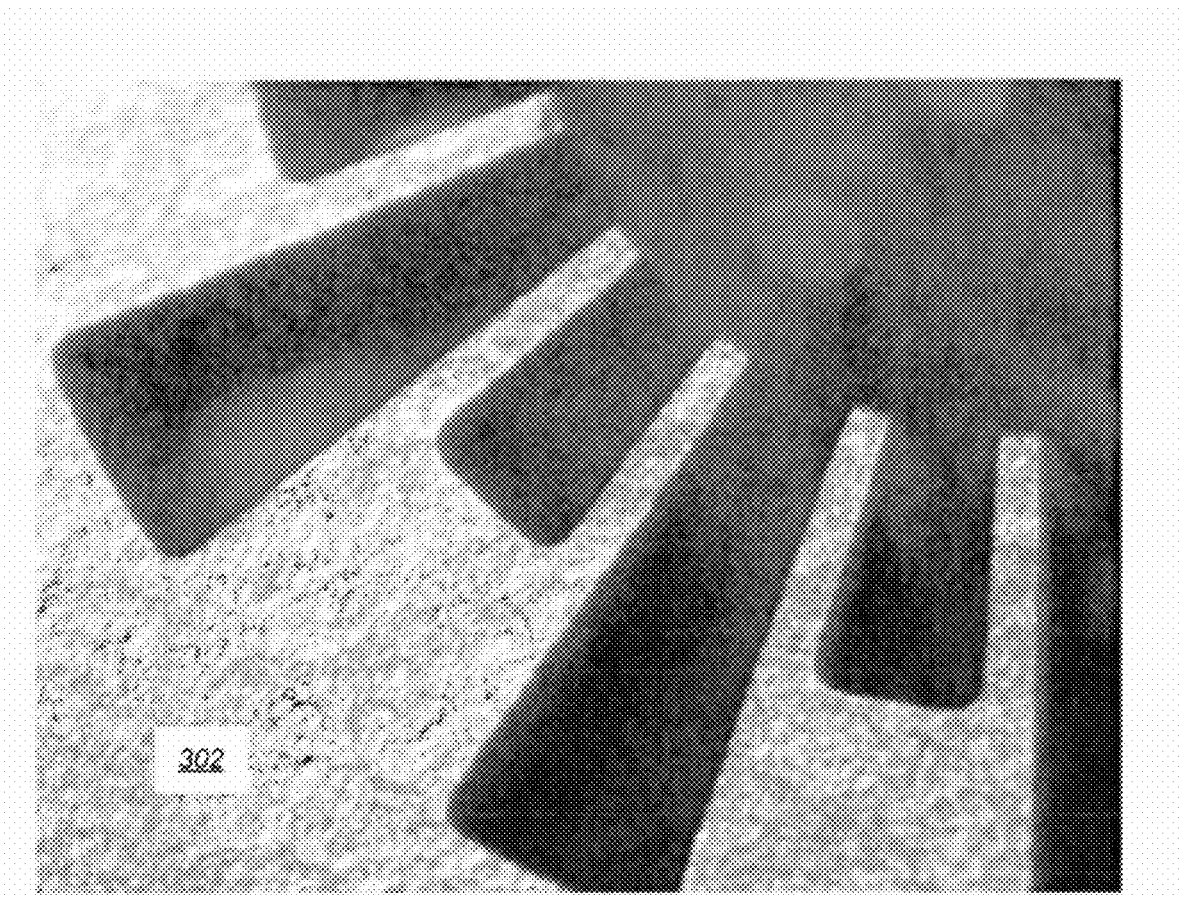
FIG. 3 depicts a magnified view of an HOPG magnetron in accordance with an embodiment of the present invention.
Figure 4:
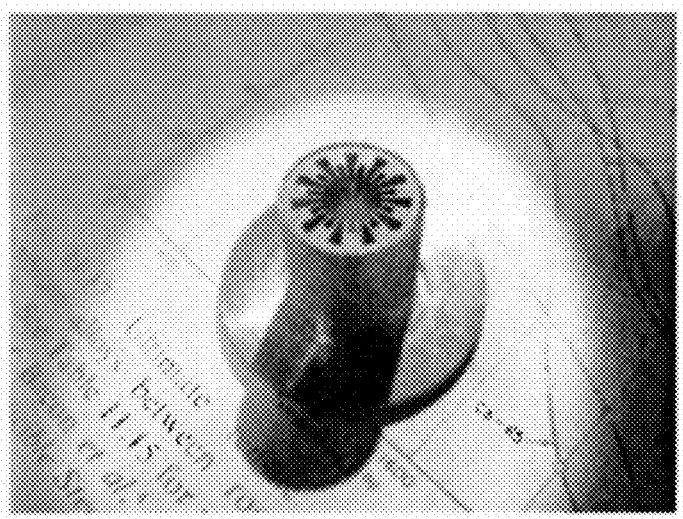
FIG. 4 depicts a brazed copper and HOPG magnetron in accordance with an embodiment of the present invention.

Nevertheless, despite these desirable properties, HOPG has not been contemplated for use in vacuum electron device components because of concerns about its structural properties, brittleness, cost, and difficulties in handling. For example, many vacuum electron device components require micromachining that is preferably performed using electrical discharge machining (EDM). However, due to its resistance to ion erosion, HOPG is difficult to process using EDM. FIG. 2 depicts a block of HOPG 202 that has been subjected to EDM via electrode 204. Extreme erosion of the electrode can be observed as indicated in region 206. Nevertheless, the precision micromachined structure 208 visible in the figure shows that EDM will work in principle for HOPG, despite general skepticism regarding the use of EDM for materials with a high resistance to ion erosion and arcing damage. FIG. 3 is a close up view of the micromachined structure, suitable for use as a 35 GHz magnetron. FIG. 4 illustrates the finished magnetron device in accordance with an embodiment of the present invention, brazed inside a copper body by the techniques described in more detail below.

Figure 5:
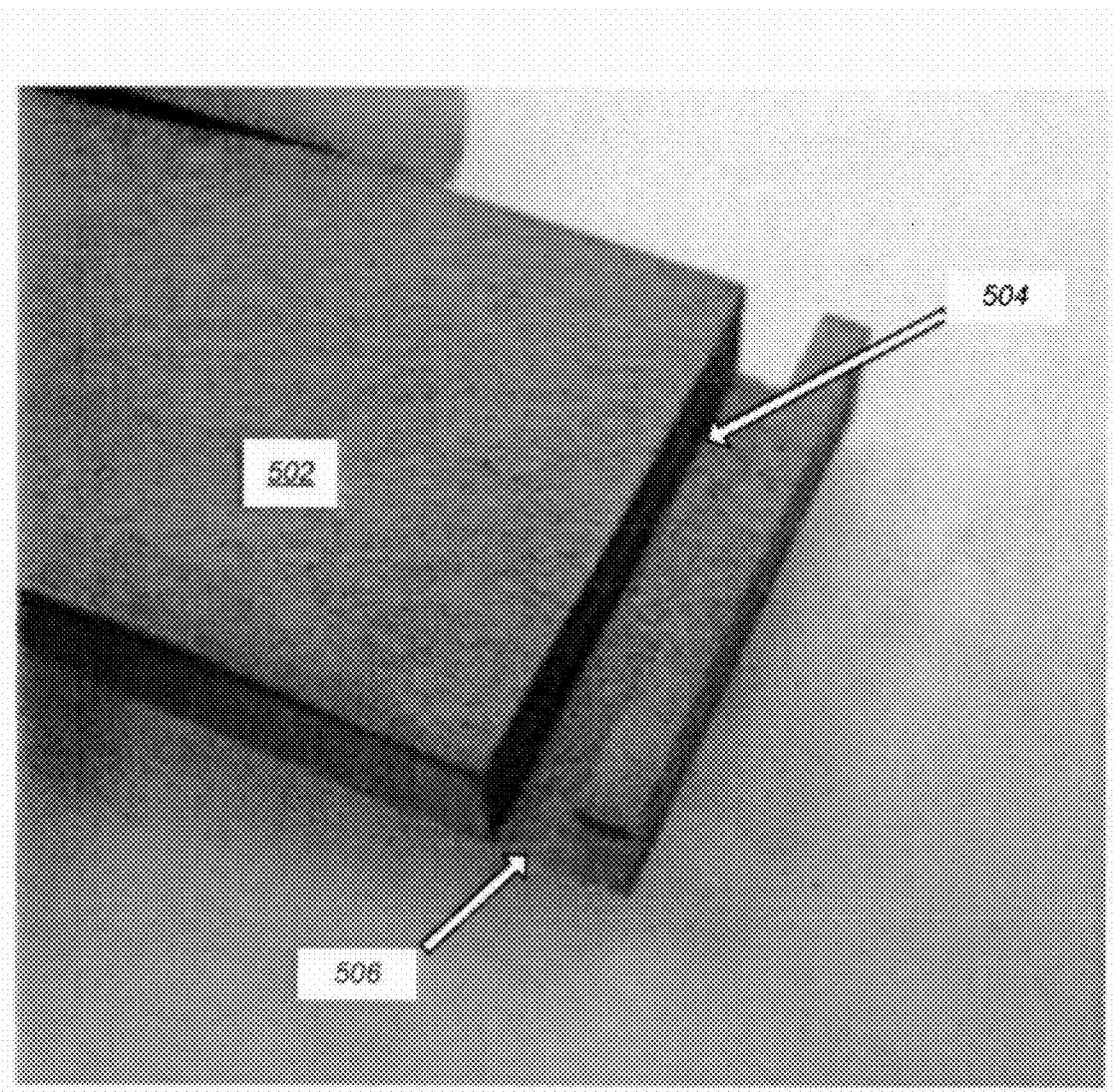
FIG. 5 depicts a milling operation performed on HOPG in accordance with an embodiment of the present invention.

FIG. 5 shows that despite conventional expectations about the brittleness of graphite, HOPG can be machined using a diamond blade and actually exhibits remarkable resiliency. The HOPG block 502 depicted in FIG. 5 has been milled using a standard diamond blade to cut a channel 504 leaving a web 506 just 0.005 inches (5 mils) thick.

Figure 6:
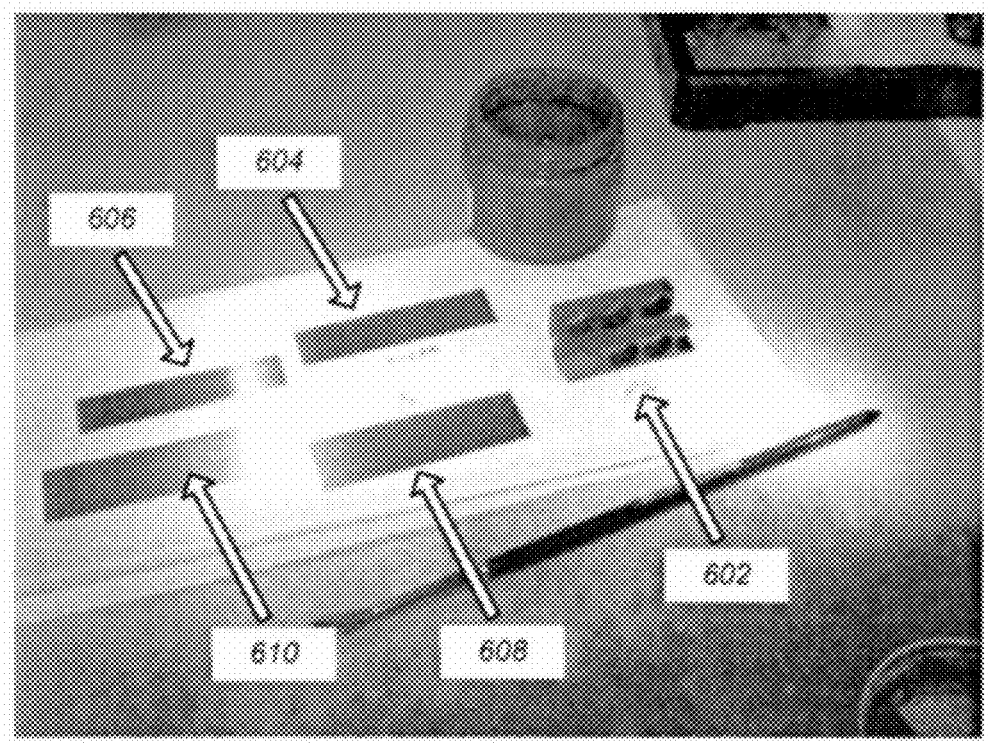
FIG. 6 depicts a pyrolytic graphite structure and other materials being prepared for brazing in accordance with an embodiment of the present invention.
Figure 7:
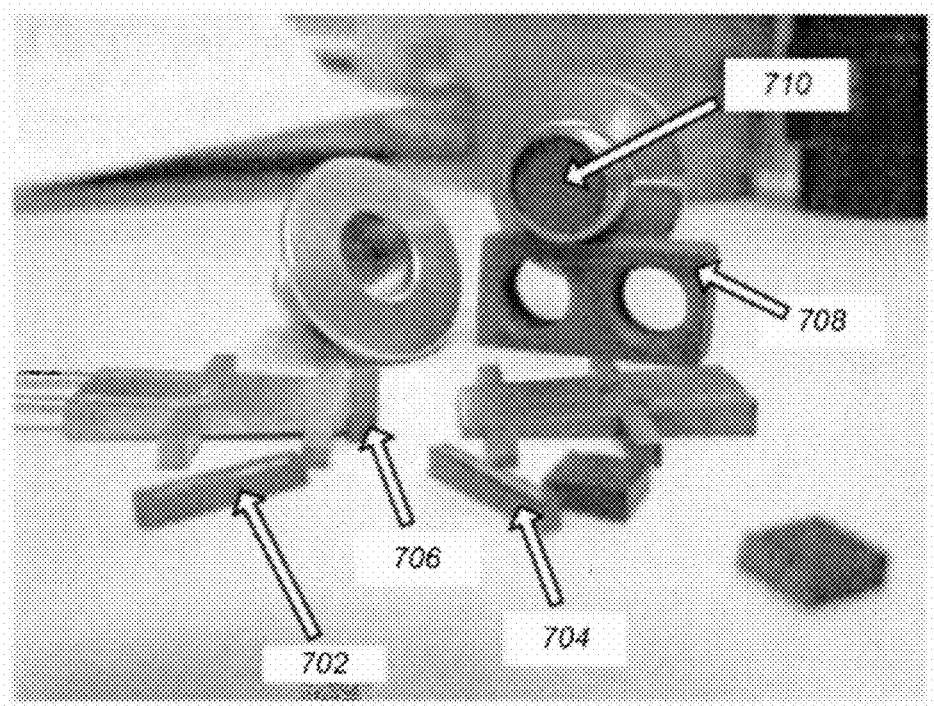
FIG. 7 depicts several microwave components in which HOPG structures are brazed to copper structures in accordance with an embodiment of the present invention.

HOPG can also be successfully brazed to common materials used in the construction of vacuum electron devices, such as Kovar, copper, molybdenum, and copper-clad molybdenum by heating in a vacuum or nitrogen-atmosphere furnace. FIG. 6 shows pre-assembly brazing test samples in accordance with an embodiment of the present invention, including a pyrolytic graphite structure 602, and sample strips of Kovar 604, molybdenum 606, copper 608, and copper-clad molybdenum 610. FIG. 7 illustrates post-brazing samples showing HOPG structures 702, 704, 706, 708, and 710, brazed to copper vacuum electron device components.

Figure 8A:
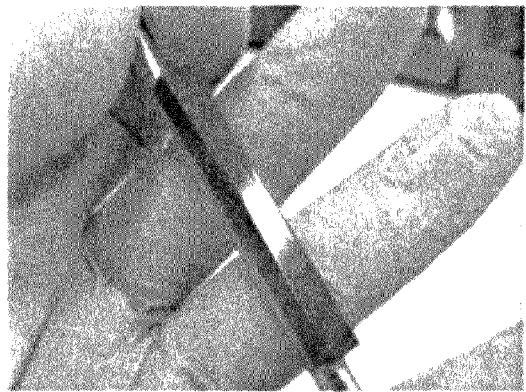
FIGS. 8a-8c depict a test structure exhibiting the resistance to braze cycling of a braze joint of metal to HOPG in accordance with an embodiment of the present invention.
Figure 8B:
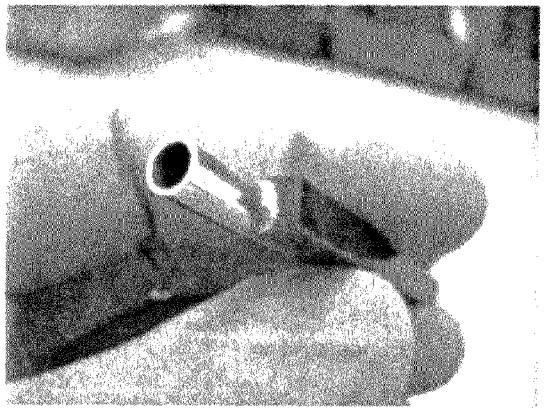
Figure 8C:
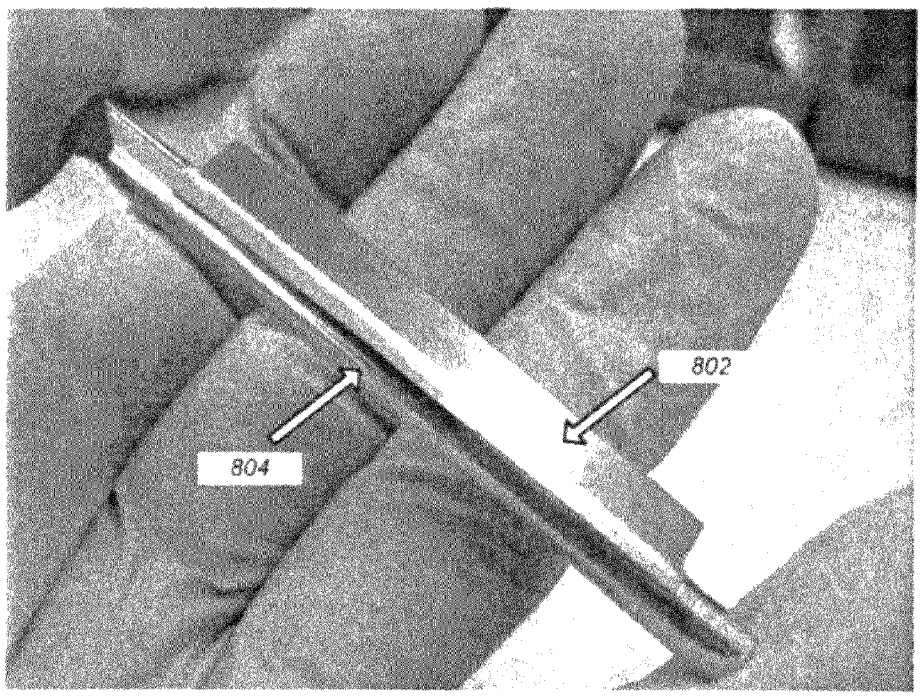
Figure 9A:
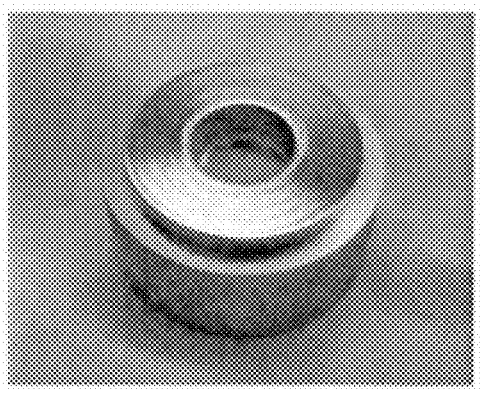
FIGS. 9a-9e depict examples of brazed HOPG microwave structures in accordance with an embodiment of the present invention.
Figure 9B:
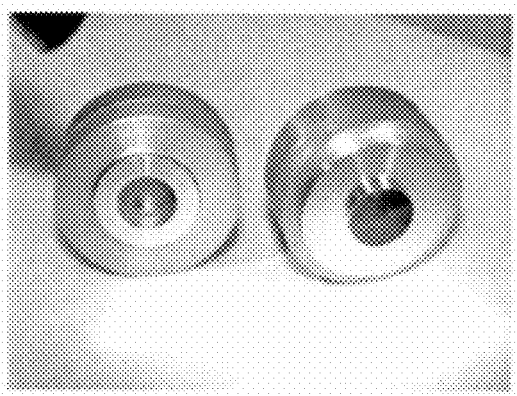
Figure 9C:
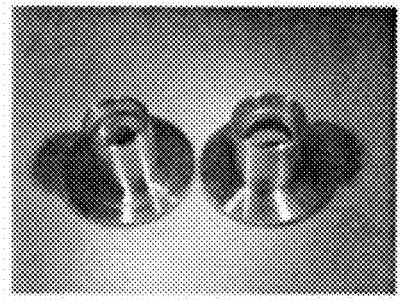
Figure 9D:
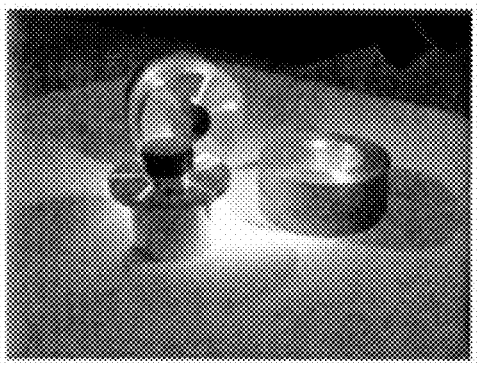
Figure 9E:
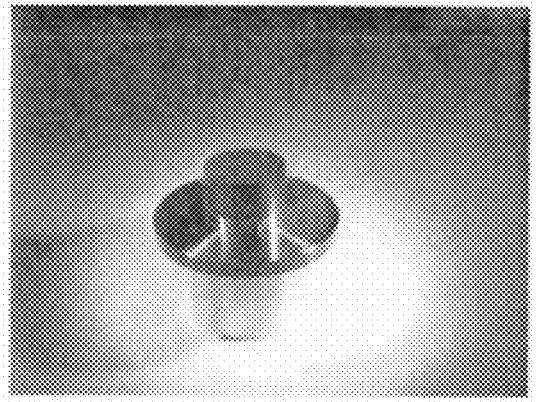

The quality of the braze joint can be seen more clearly in FIGS. 8a-c, which depict a greatly oversized backward-wave cross field amplifier (CFA) vane structure in which cooling tube 804 is bonded to a vane 802 made from HOPG, in accordance with an embodiment of the present invention. The structure pictured was braze cycled multiple times and exhibits excellent resistance to delamination, as can be observed. FIGS. 9a-e depict additional examples of components in accordance with an embodiment of the present invention that includes HOPG structures brazed to metal structures made from copper and molybdenum.

Figure 10A:
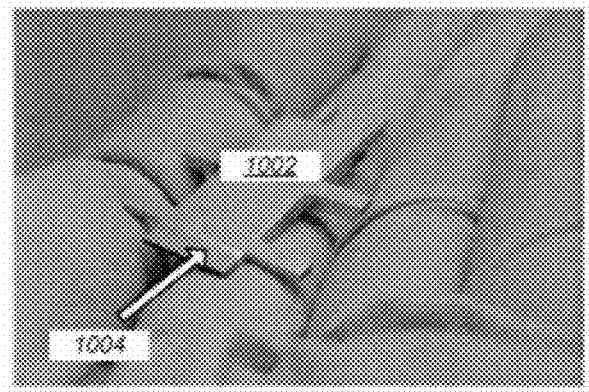
FIGS. 10a-10b depict a forward wave cross field amplifier vane including an HOPG tip accordance with an embodiment of the present invention.
Figure 10B:
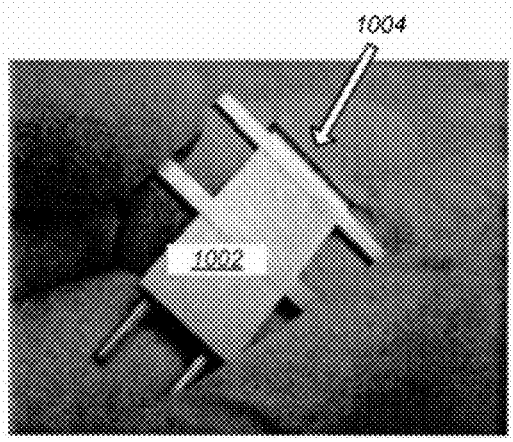
Figure 11:
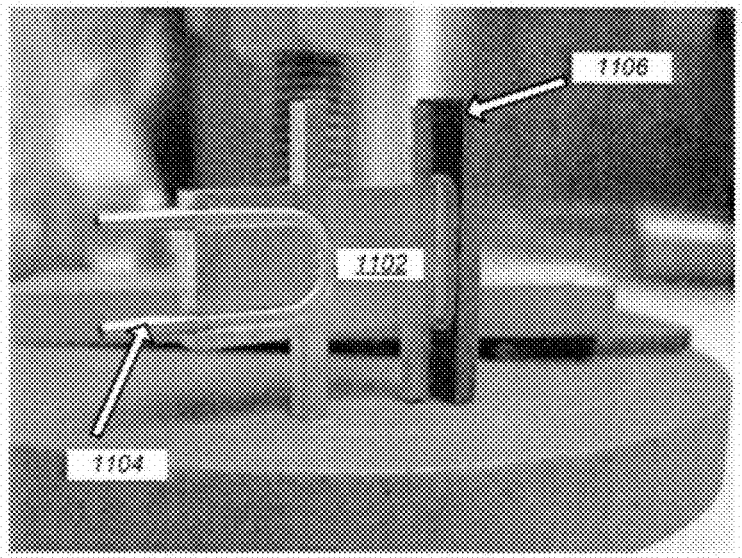
FIG. 11 depicts an alternative embodiment of a forward wave cross field amplifier vane including an HOPG tip in accordance with an embodiment of the present invention.

FIGS. 10a-b depict a forward wave cross field amplifier (FWCFA) vane 1002 made from copper that includes an HOPG tip 1004 brazed in place. The HOPG tip provides improved thermal conduction, enhancing the performance of the cooling vane. FIG. 11 similarly shows a copper vane 1102 to which a larger HOPG tip 1106 has been affixed by active metal brazing. Note that this vane also includes a cooling tube 1104 brazed into a channel cut in the vane 1102.

Figure 12:
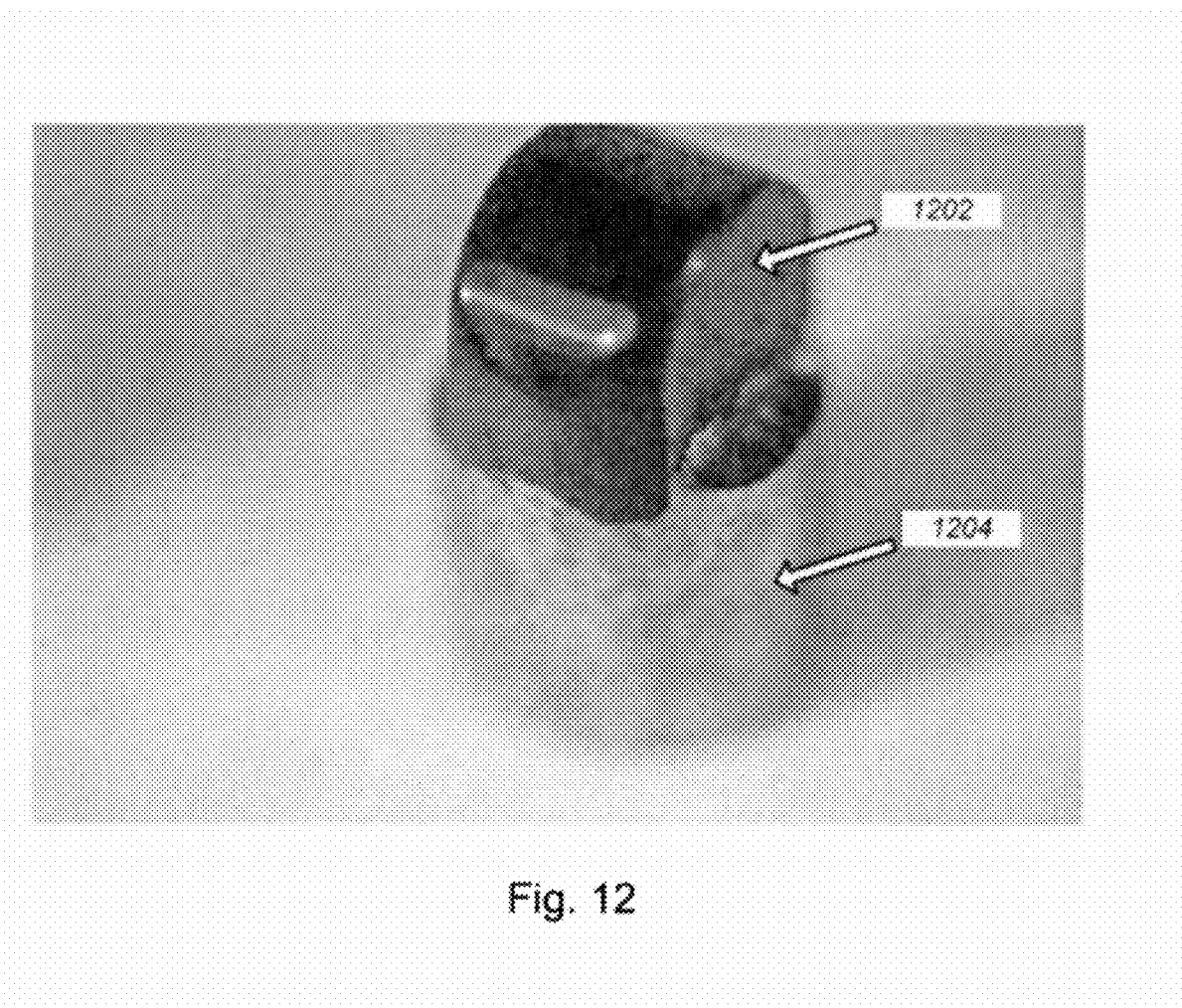
FIG. 12 depicts a brazed HOPG test structure in accordance with an embodiment of the present invention.

FIG. 12 shows a small test sample of HOPG 1202 attached to a copper body 1204 by active metal brazing techniques using a non-silver bearing alloy of 35% gold and 65% copper. This test sample was then lathe turned and polished three times and inspected for voids. None were found.

Figure 13:
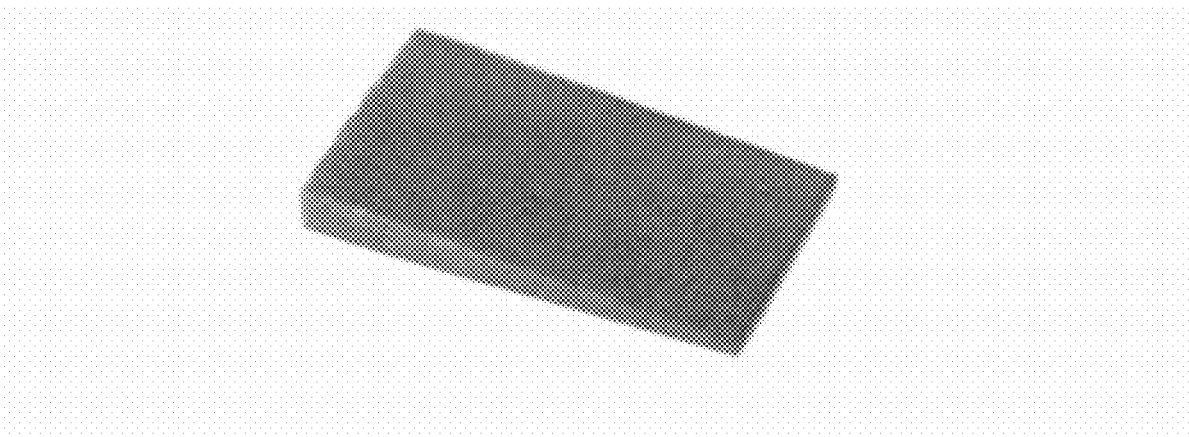
FIG. 13 depicts an HOPG insert in accordance with an embodiment of the present invention.
Figure 14:
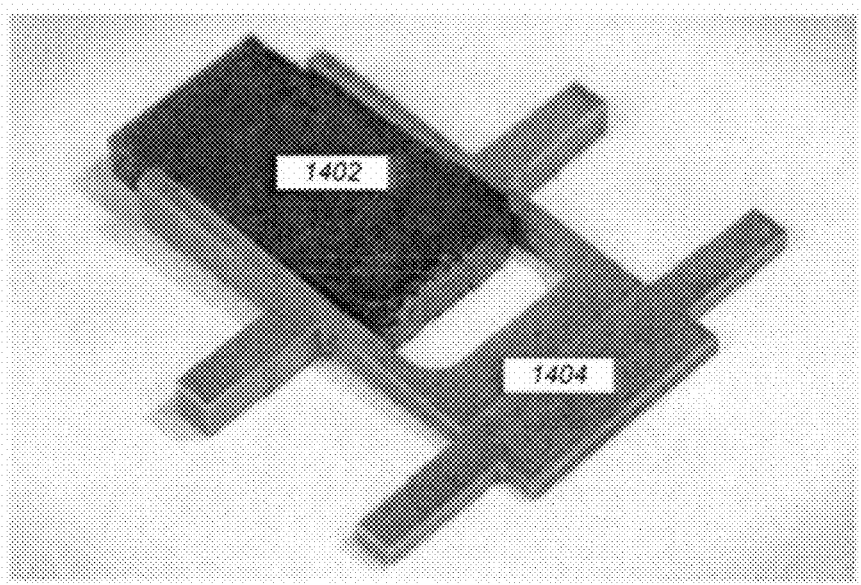
FIG. 14 depicts a copper CFA vane with an HOPG insert in accordance with an embodiment of the present invention.

FIGS. 13 and 14 depict a CFA vane constructed in accordance with an embodiment of the present invention. FIG. 13 shows an HOPG wedge insert, tapered and machined to fit inside a copper vane structure. FIG. 14 illustrates how the HOPG insert 1402 would slide into the copper vane frame 1404. Once the insert 1402 is properly located within the frame 1404, the entire assembly would be brazed. The high thermal conductivity of the HOPG insert 1402 provides superior thermal performance.

Figure 15:
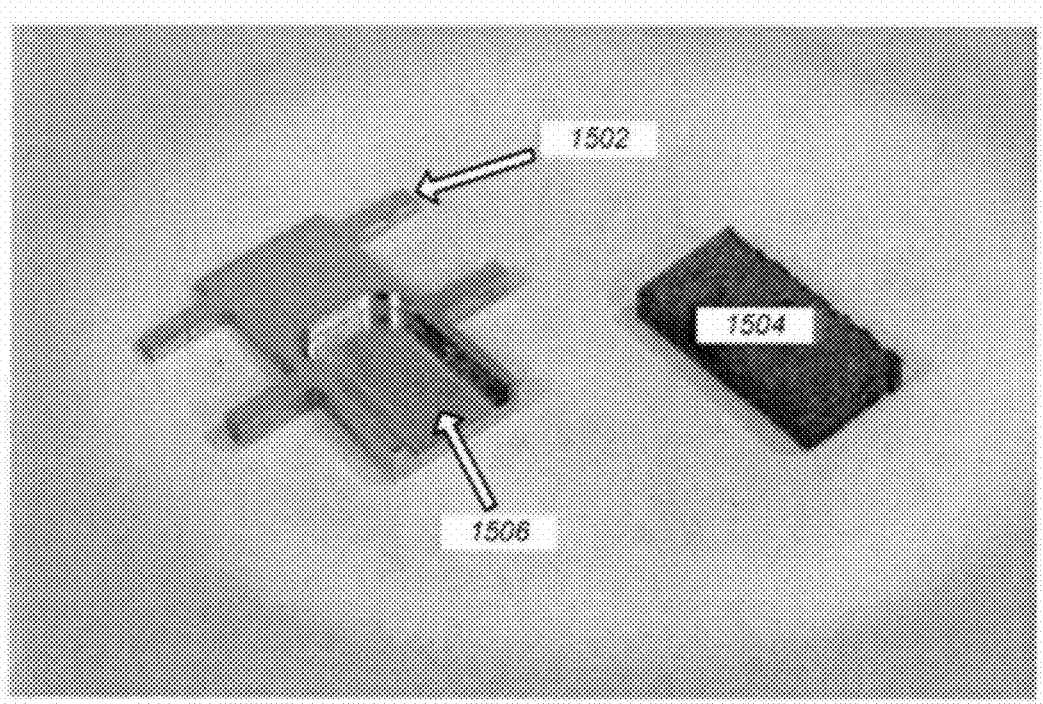
FIG. 15 depicts an alternative embodiment of a copper CFA vane with an HOPG insert in accordance with an embodiment of the present invention.
Figure 16:
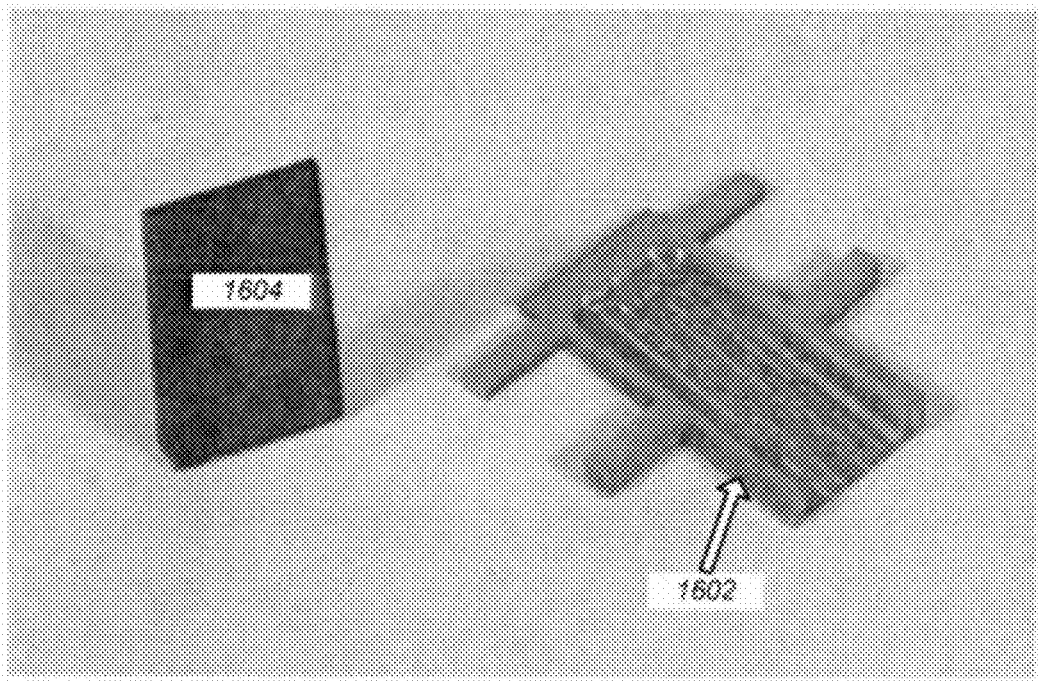
FIG. 16 depicts still another alternative embodiment of a copper CFA vane with an HOPG insert in accordance with an embodiment of the present invention.
Figure 17A:
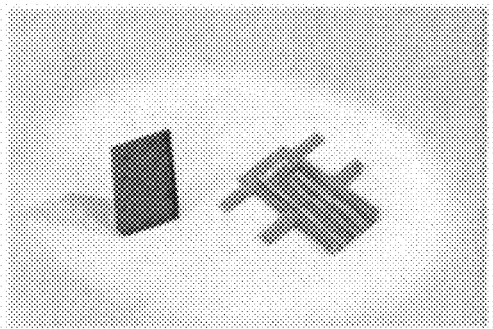
FIG. 17 depicts additional views of the copper CFA vanes having HOPG inserts depicted in FIGS. 15 and 16.
Figure 17B:
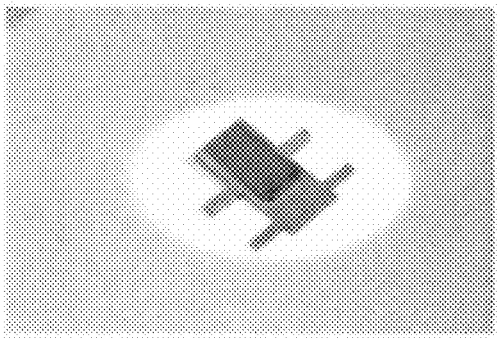
Figure 17B:
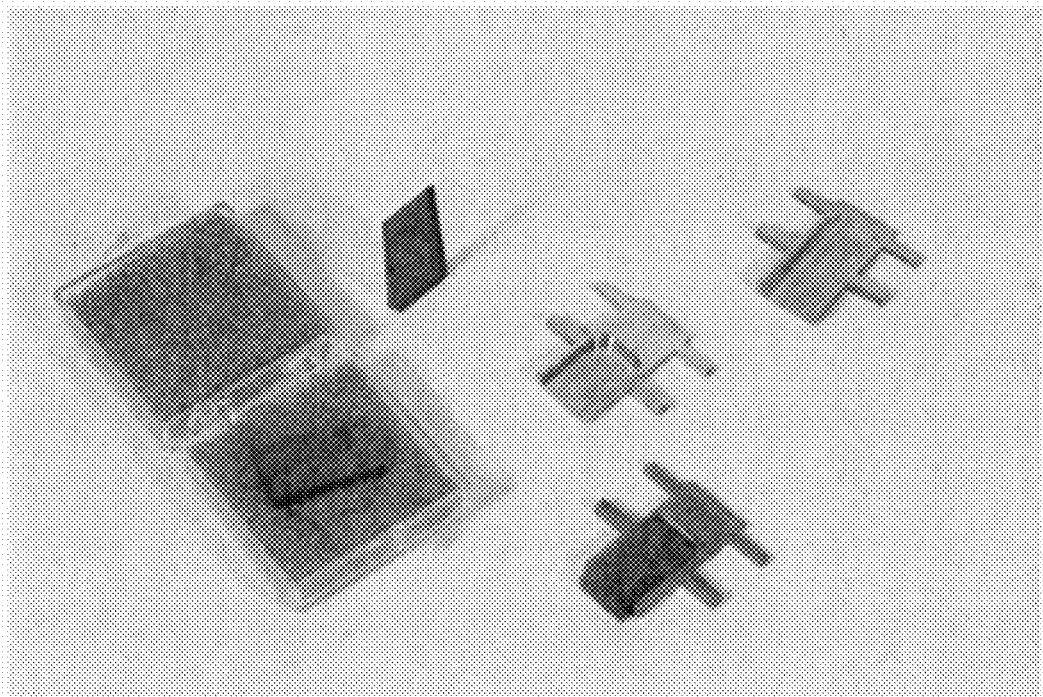

FIGS. 15 and 16 depict alternative embodiments of a CFA vane with an HOPG insert. In this case, the copper vane 1502 includes a milled cavity 1506 into which the HOPG insert 1504 is placed and then bonded by brazing. The embodiment of FIG. 16 is similar with a slightly larger cavity milled in the vane 1602 for accepting the HOPG insert 1604. Embodiments such as those depicted in FIGS. 15 and 16 may provide for additional mechanical strength by allowing a copper web to remain in place. Additional views of these embodiments are provided in FIGS. 17a-c.

Figure 18A:
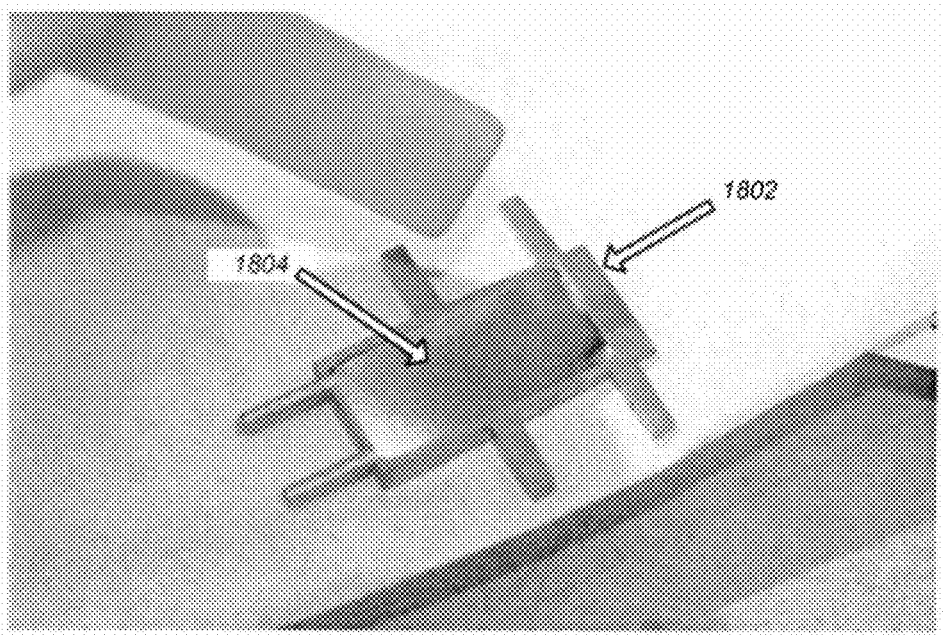
FIGS. 18a and 18b depict a copper vane milled out to leave a thin copper web to support the pyrolytic graphite insert, in accordance with an embodiment of the present invention.
Figure 18B:
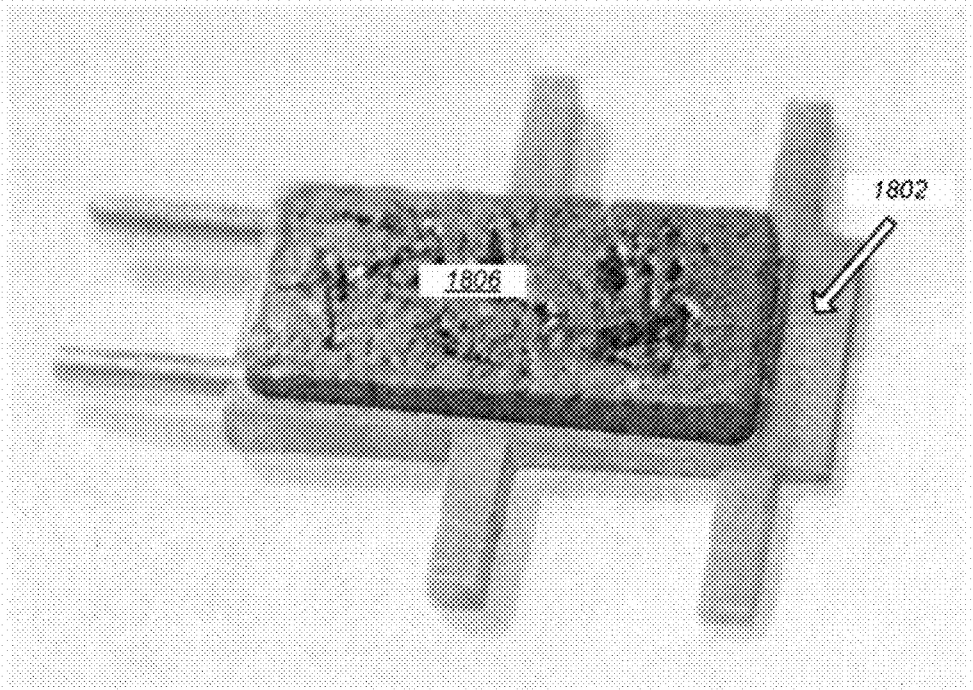
Figure 19A:
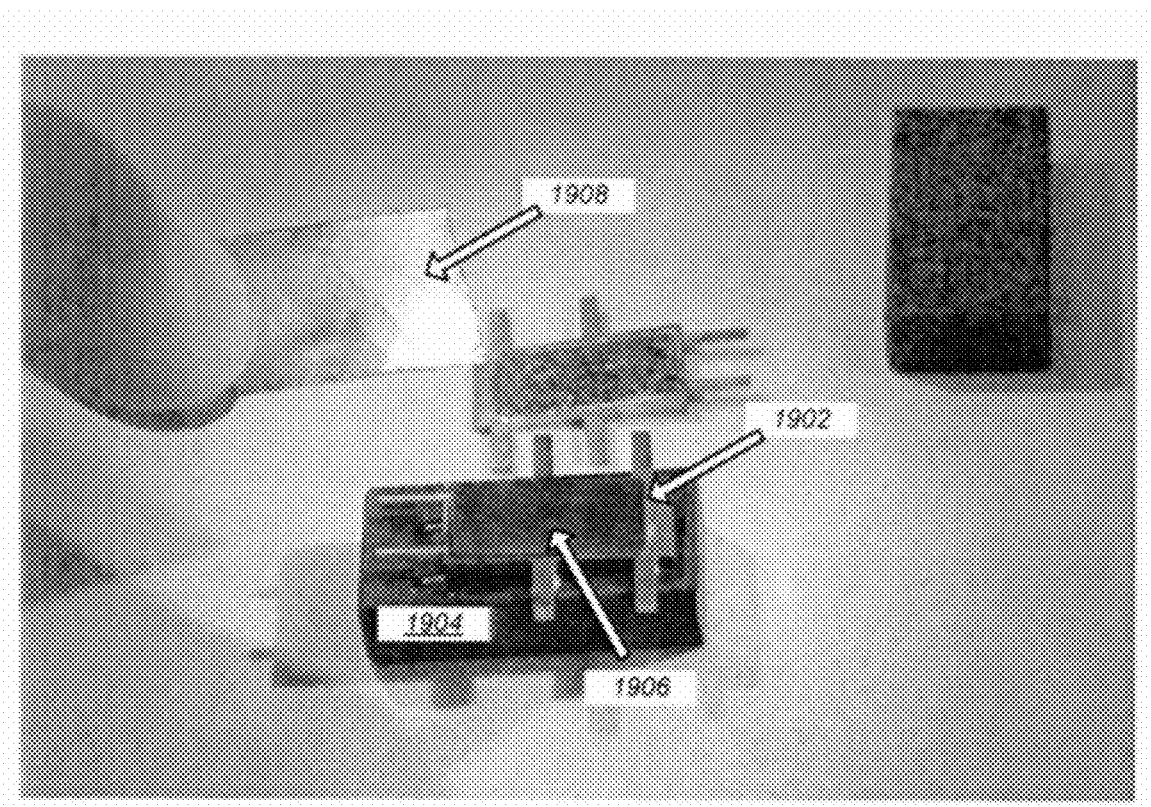
FIGS. 19a and 19b depict an embodiment of a special fixture designed to apply pressure to the vane assembly during brazing, in accordance with an embodiment of the present invention.
Figure 19B:
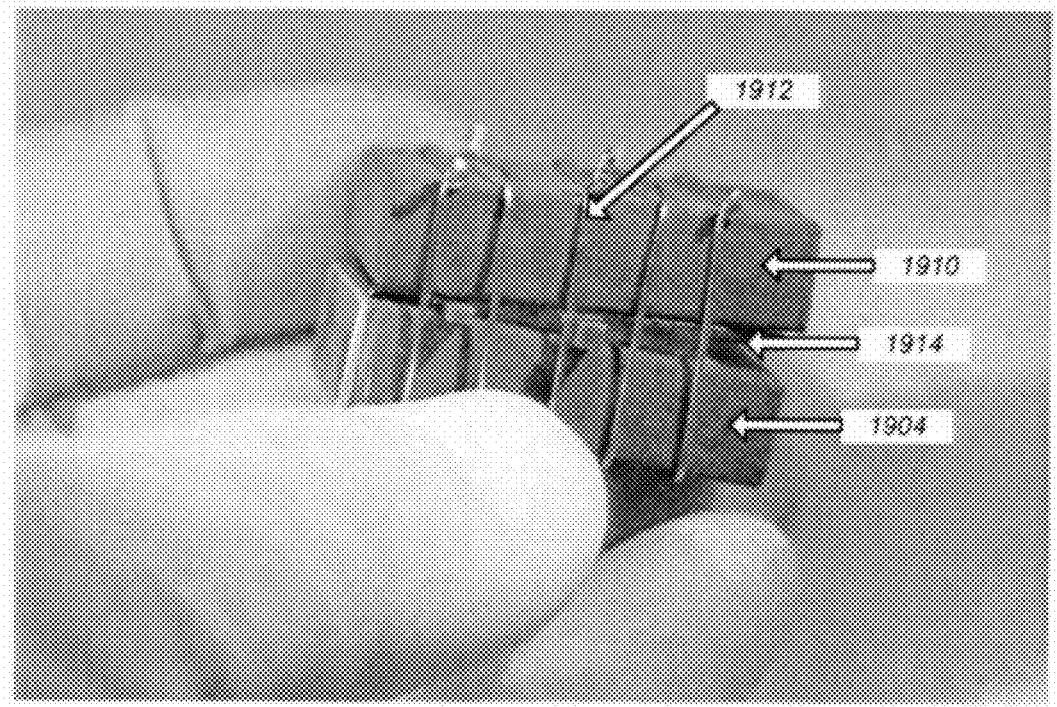

FIGS. 18a and 18b depict the same vane design as that shown in FIGS. 15 and 16. FIG. 18a shows a vane 1802 made from copper that has been milled out leaving a thin copper web 1804. FIG. 18b shows a block of HOPG 1806 inserted into the milled cavity in the copper vane 1802. The HOPG insert must be brazed to the copper vane, but a difficulty that arises stems from the fact that HOPG and copper have different coefficients of thermal expansion, and even with very precise machining tolerances, a large average gap of up to 0.006 inches develops when the assembly is brought to brazing temperature. Prior designs relied on additional braze filler wire on the top surface of the vanes to fill the void. While that method can work, it is prone to uneven and incomplete gap loading. In addition, excess braze alloy can squeeze out and bond to the braze fixture. The improved process comprises calculating a precise volume of additional braze alloy and placing it at the base of the core and then securing the assembly in a special braze fixture. FIGS. 19a and 19b depict an embodiment of a special braze fixture in accordance with the present invention that produces uniform gap loading free of voids and overcomes the problem of braze alloy bonding to the fixture. FIG. 19a depicts the vane assembly 1902 positioned on top of a steel fixture block 1904. The HOPG block is inside the vane assembly along with a precise volume of braze alloy, and a thin copper plate 1906 is placed on top to close out the assembly. In the event that any braze alloy leaks out during the brazing process, a thin layer of carbon felt 1908 is placed between the assembly and the top of the fixture to prevent the alloy from bonding to the fixture.

In order to assure proper flow of the braze alloy through the gap while the alloy is in a liquid phase, the fixture depicted in FIG. 19b applies pressure to the assembly to force the Pyrolytic Graphite as close as possible to the base of the cored vane. In the embodiment shown in FIG. 19b, the fixture comprises a lower steel block 1904 and an upper steel block 1912. They are sandwiched around the vane assembly 1914 and secured with nichrome wire 1912 to make a bimetallic fixture. Nichrome wire exhibits a thermal expansion coefficient different enough from copper and steel to ensure that the assembly is maintained under pressure even when the assembly is brought to braze temperature. The pressure applied by the fixture forces the braze alloy through the gaps between the pyrolytic graphite and the copper and effectively eliminates voids.

Figure 20:
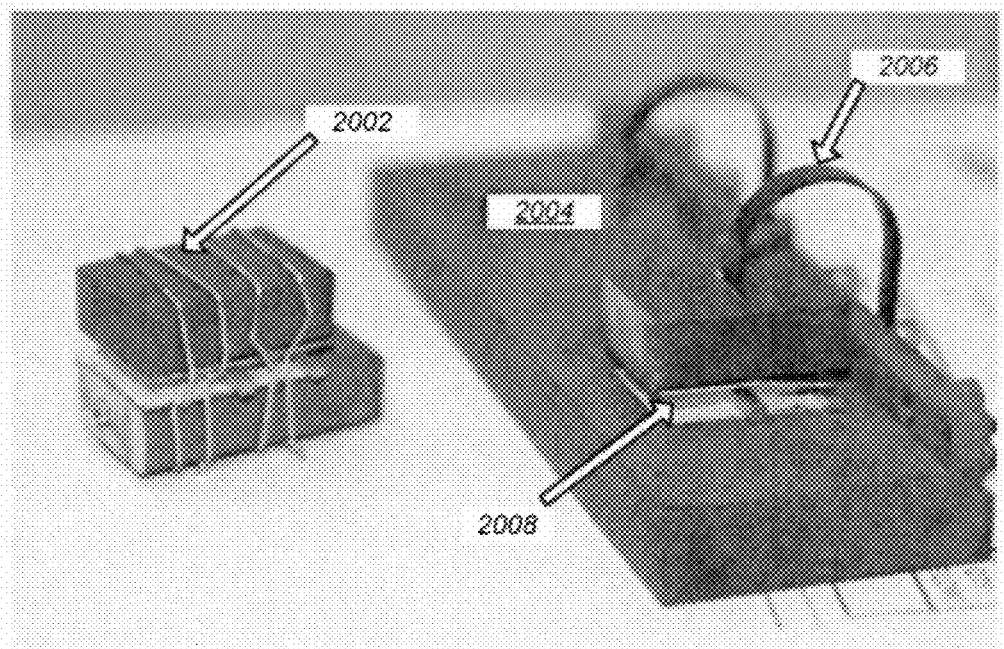
FIG. 20 depicts two additional embodiments of fixtures using bimetallic spring tension and cantilevered springs, respectively, to apply pressure to the assembly during brazing, in accordance with an embodiment of the present invention.

FIG. 20 depicts two additional successful embodiments of the fixture design. The fixture shown at 2002 is very similar to that depicted in FIG. 19b. However, in this case, the nichrome wires are bent to create spring tension to more effectively maintain pressure on the vane assembly during brazing. The other fixture embodiment includes a cantilevered tensioning spring 2006 for applying pressure to the assembly 2008 during the brazing process. The embodiment shown includes a steel base 2004 and one assembly 2008 in place for brazing, but the fixture can accommodate up to six assemblies if desired. The bimetallic fixture and cantilevered spring fixture are preferred over weighted fixtures because weighted fixtures require large size and a corresponding large thermal mass.

Embodiments in accordance with the present invention that supply the excess alloy from underneath the Pyrolytic Graphite also solve the problem of having excess alloy in proximity to the fixture. When excess alloy is allowed to contact the fixture, it invariably bonds to the fixture, due to the principles of chemically active brazing. Some embodiments of the present invention may employ boron nitride to prevent bonding of the fixturing. And to produce uniform fixturing pressure, carbon felt may be layered within the fixturing in some embodiments, as shown in FIG. 19a, for example, in accordance with the present invention.

Figure 21A:
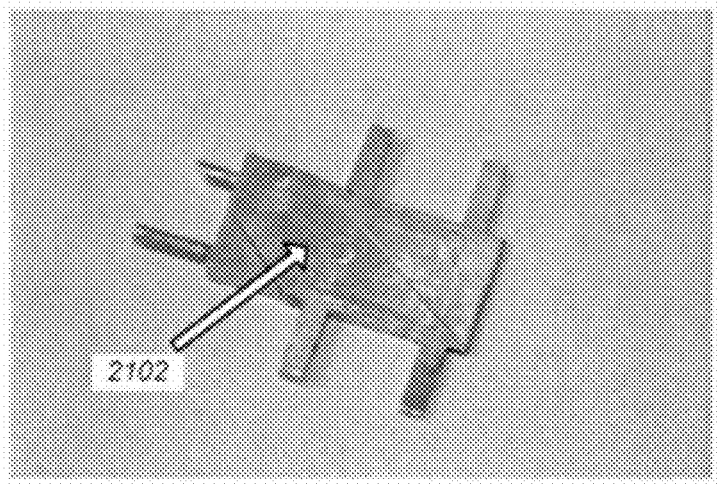
FIGS. 21a, 21b, and 21c depict a sectioned copper vane assembled and brazed in accordance with an embodiment of the present invention.
Figure 21B:
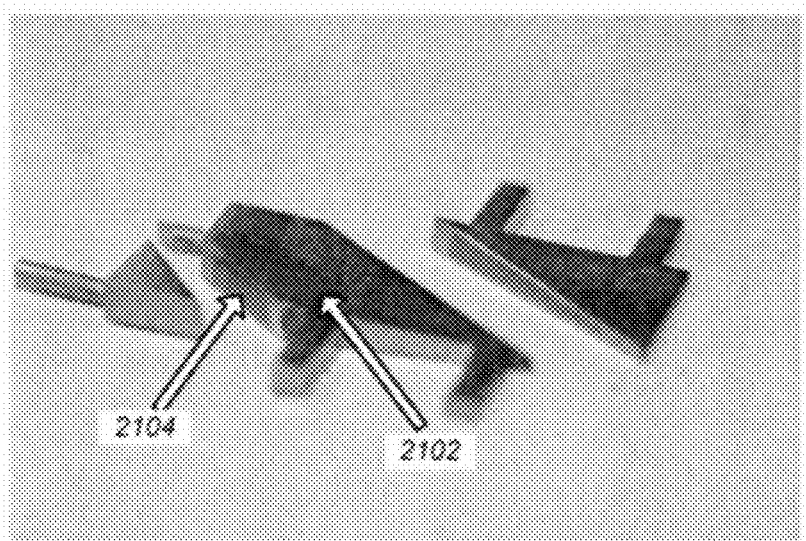
Figure 21C:
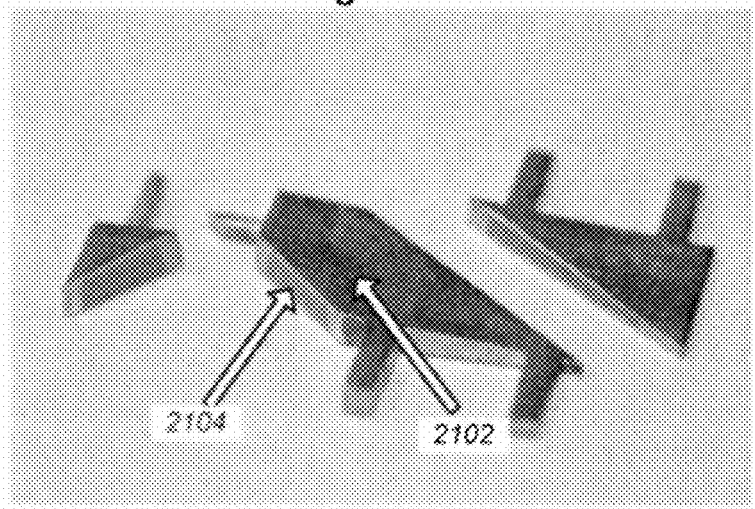

FIGS. 21a-c depict a cross sectioned vane designed and assembled according to an embodiment of the present invention. The finished assembly 2102 is shown in FIG. 21a. Two cuts were made across the device to reveal the inner structure as shown in FIGS. 21b and 21c. The HOPG core 2104 is visible inside the assembly 2102. It can be seen that the HOPG core is uniformly bonded to the copper structure and that there are no visible voids.

While numerous specific examples of HOPG components for vacuum electron devices are discussed above and illustrated in the attached figures, these are provided only as examples and are not meant to limit the scope of the invention. One skilled in the art will recognize that HOPG may be used for many other microwave components that would benefit from its desirable properties as discussed above. These additional applications would also fall within the scope and spirit of the present invention.

The invention is further defined by the following claims.

What is claimed is:

1. A component for use in a vacuum electron device comprising:
    a first portion constructed from highly oriented pyrolytic graphite (HOPG), the first portion having a high thermal conductivity;
    a second portion constructed from a metal;
    at least one braze joint operatively joining the first portion to the second portion, wherein:
    the at least one braze joint provides both mechanical and thermal coupling of the first HOPG portion and the second metal portion.

2. The vacuum electron device component of claim 1, wherein the second portion is constructed from at least one of copper, molybdenum, kovar, and a copper-molybdenum alloy.

3. The vacuum electron device component of claim 1, wherein the braze joint comprises a gold-copper alloy.

4. The vacuum electron device component of claim 1, wherein the vacuum electron device component exhibits a thermal conductivity that is higher than that of a similar component made from metal.

5. The vacuum electron device component of claim 1, wherein the component comprises one of a cross field amplifier (CFA) vane structure, a magnetron structure, an electron tube anode structure, and an electron tube cathode structure.

6. The vacuum electron device component of claim 1, wherein the second portion comprises a milled metal structure and the first portion comprises an HOPG insert sized to fit within the milled metal structure.

7. A method of manufacturing a microwave component including at least one highly oriented pyrolytic graphite portion and at least one metal portion comprising the steps of:
    machining the at least one metal portion to create a brazing surface;
    machining the at least one HOPG portion to create a surface closely matched to the brazing surface of the metal portion;
    calculating a volume of brazing alloy that will fit between the brazing surface of the metal portion and the closely matched surface of the HOPG portion;
    creating an assembly by applying the calculated volume of brazing alloy between the brazing surface of the metal portion and the closely matched surface of the HOPG portion;
    heating the assembly in a brazing furnace to create a mechanical and thermal bond between the at least one HOPG surface and the at least on metal surface.

8. The method of claim 7, wherein the step of machining the at least one HOPG portion comprises milling the HOPG portion using a diamond blade.

9. The method of claim 7, wherein the step of machining the at least one metal portion to create a brazing surface comprises creating a cavity in the at least one metal portion wherein the brazing surface comprises a thin metal web.

10. The method of claim 7, wherein the step of creating an assembly further comprises applying a clamping fixture to the at least one metal portion and the at least one HOPG portion such that pressure is applied during the heating step.

11. The method of claim 10, wherein the step of applying a clamping fixture comprises wrapping the assembly with nichrome wire.

12. The method of claim 11, wherein the step of wrapping the assembly with nichrome wire further comprises bending the nichrome wire to create spring tension that applies pressure to the assembly.

13. The method of claim 7, wherein the step of heating the assembly further comprises heating the assembly in a vacuum chamber.

14. The method of claim 7, wherein the step of heating the assembly further comprises heating the assembly in a nitrogen atmosphere.

15. The method of claim 7, wherein the HOPG portion is further covered with a metal foil to be bonded when the assembly is heated in the brazing furnace.

16. The method of claim 15, wherein the metal foil comprises one of copper, copper-molybdenum, molybdenum, and kovar.

17. A clamping fixture for applying pressure during brazing to an assembly that includes at least one highly oriented pyrolytic graphite (HOPG) portion and at least one metal portion, the clamping fixture comprising:
    a first block positioned on a first side of the assembly;
    a second block positioned on a second side of the assembly, wherein the second side is substantially opposite to the first side; and
    a tensioning device operatively connected to the first block and the second block and configured to apply pressure to the first and second blocks such that the assembly is squeezed between them while the assembly is heated in a brazing furnace.

18. The clamping fixture of claim 17, wherein the tensioning device comprises at least one loop of nichrome wire.

19. The clamping fixture of claim 18, wherein the at least one loop of nichrome wire includes a bent portion that applies spring compression to the first and second blocks.

20. The clamping device of claim 17, wherein at least one of the first and second blocks is constructed of steel.

21. The clamping device of claim 17, wherein the tensioning device comprises a cantilevered tensioning spring.

22. The clamping device of claim 17, further comprising boron nitride felt positioned between the first block and the assembly to prevent excess brazing material from bonding to the first block during brazing.

* * * * *